Nov. 2, 1937.    D. W. VOORHEES, JR    2,098,018
STEEL TONGUE FOR FARM TRUCKS
Filed July 24, 1936
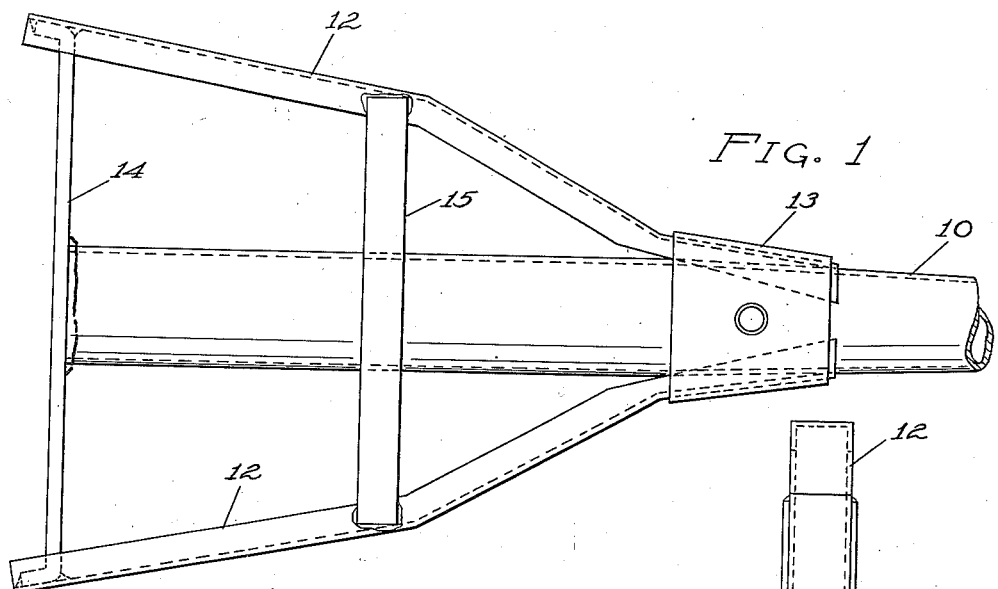
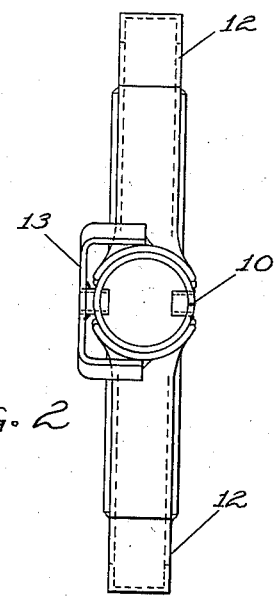
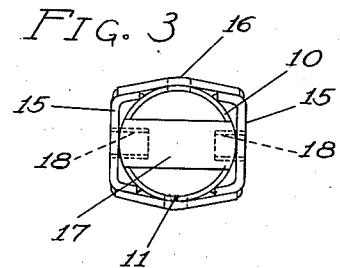
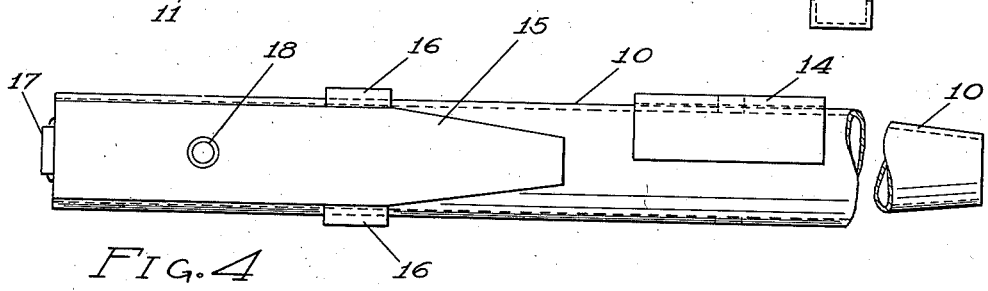
INVENTOR.
BY *Daniel W. Voorhees Jr.*
*Pefft & Pefft*
ATTORNEY.

Patented Nov. 2, 1937

2,098,018

UNITED STATES PATENT OFFICE 2,098,018

STEEL TONGUE FOR FARM TRUCKS

Daniel W. Voorhees, Jr., Peru, Ill.

Application July 24, 1936, Serial No. 92,289

2 Claims. (Cl. 278—43)

This invention is directed to steel farm trucks or wagons and particularly to the structure of the steel tongue for same.

The growing importance of automobile trucks in the transportation of farm products has had the effect of reducing the commercial demand for high grade, high cost farm wagons of wood construction and has produced a need for strong, light, but comparatively cheap farm trucks.

One object of this invention is to produce a light steel wagon tongue which may be produced in a plant equipped for fabricating steel parts.

Another object is to produce a steel tongue adaptable for installation on a truck utilizing pivotal axles of the automobile type and also to the common stiff axle design.

A still further object is to develop a design for a light steel tongue that will provide ample bearing surface for whiffle tree bolts and the like.

Other objects will be disclosed by an examination of the following drawing and descriptions of which—

Fig. 1 is the plan view of a steel wagon tongue and tongue support for a stiff axle wagon;

Fig. 2 is an end elevation view of the same tongue as it would appear viewed from the right of Fig. 1;

Fig. 3 is an end view of a tongue for a pivotal axle truck; and,

Fig. 4 is an elevational view of the same tongue as Fig. 3.

The tongue proper 10 is made from a light steel sheet formed in a die in a power press with seam on bottom at 11.

In Figs. 1 and 2 are channel iron braces 12 attached to the tongue on the front by the whiffle plate 13 and by welding all members to the tongue proper. At the rear are braces 14 and 15 supporting the side braces 12 and preventing the light tongue 10 from collapsing under stress.

In Figs. 3 and 4 showing a pintle axle tongue the whiffle plate 14 is welded directly to the tongue as also are the side plates 15.

Cross braces 16 and 17 are welded in position to prevent the collapse of the light steel tongue under turning stress.

Steel tubes 18 are welded in position to provide sufficient bearing area for the queen bolt.

Having thus described my invention, what I now claim as new is:

1. A steel tongue for a farm truck in combination, a seamed tubular sheet metal body, vertically aligned openings in the forward portion of said body, a whiffle plate having an opening in registry with said openings in the body, a horizontal brace welded to the rear end of said tongue body and extending laterally thereof, channel iron braces welded to said tongue body and whiffle plate and extending rearwardly and laterally for welded attachment to the respective outer ends of the first mentioned brace, steel tubes cooperating with the openings in said body and whiffle plate and welded thereto.

2. A steel tongue for a farm truck in combination, a seamed tubular sheet metal body, vertically aligned openings in the forward portion of said body, a whiffle plate having an opening in registry with said openings in the body, a horizontal brace welded to the rear end of said tongue body and extending laterally thereof, channel iron braces welded to said tongue body and whiffle plate and extending rearwardly and laterally for welded attachment to the respective outer ends of the first mentioned brace, steel tubes cooperating with the openings in said body and whiffle plate and welded thereto, a second horizontal brace spaced centrally of the rear brace and said whiffle plate and welded connection between the outer ends of said second brace and said channel iron braces.

DANIEL W. VOORHEES, JR.